US007280350B2

(12) United States Patent  (10) Patent No.: US 7,280,350 B2
Austin  (45) Date of Patent: Oct. 9, 2007

(54) COMPUTING DEVICES

(75) Inventor: James Leonard Austin, Driffield (GB)

(73) Assignee: Cybula Limited, Yorkshire (GB)

( * ) Notice: Subject to any disclaimer, the term of this patent is extended or adjusted under 35 U.S.C. 154(b) by 352 days.

(21) Appl. No.: 10/489,467

(22) PCT Filed: Sep. 10, 2002

(86) PCT No.: PCT/GB02/04104

§ 371 (c)(1),
(2), (4) Date: Mar. 10, 2004

(87) PCT Pub. No.: WO03/023583

PCT Pub. Date: Mar. 20, 2003

(65) Prior Publication Data

US 2004/0243528 A1    Dec. 2, 2004

(30) Foreign Application Priority Data

Sep. 10, 2001 (GB) ................................. 0121796.7
Sep. 19, 2001 (GB) ................................. 0122587.9

(51) Int. Cl.
*G06F 1/16*    (2006.01)

(52) U.S. Cl. ................. 361/683; 710/317; 400/612
(58) Field of Classification Search ........ 361/679–687, 361/724–727, 735; 400/83, 612; 710/317; D14/113, 114
See application file for complete search history.

(56) References Cited

U.S. PATENT DOCUMENTS 5,691,885 A * 11/1997 Ward et al. .................. 361/735
5,823,689 A * 10/1998 Nehowig et al. ............. 400/83
6,324,052 B1 * 11/2001 Azima et al. ................ 361/683
6,687,128 B2 * 2/2004 Tokuhara ..................... 361/724

* cited by examiner

*Primary Examiner*—Hung Van Duong
(74) *Attorney, Agent, or Firm*—Barnes & Thornburg, LLP (57) ABSTRACT

Each of a cluster of computing balls (1) contains within its housing (3) a photosensitive device (51) for receiving light from a light source (5) and converting it into energy to power a processing chip (2). There is thus wireless transmission of power to the computing balls (1), which also carry out wireless communication of data with one another. The computing balls (1) may be poured at random into a container (6), and intercommunicate to form a computing device.

20 Claims, 8 Drawing Sheets

Example of powering the system using light.
This could include lights within the cluster.

Fig. 1. Processing element embedded in ball.

Fig. 2. Diagram of a ball containing processor and optical communication.

Fig. 3. Processing ball showing example position of battery plates in dimples on the surface of the ball, connecting to processing chip.

Fig. 4. An example of Ball Cluster arrangement

Fig. 5. An alternative ball cluster arrangement.

Fig. 6. An example of wireless communication to nearest neighbours to central ball.

Fig. 7. Example of powering the system using light.
This could include lights within the cluster.

Fig. 8. Ball Cluster, showing an example of water cooling, by forcing water through ball array. This could be battery acid if the balls are powered in this way. Air cooling could be achieved in a similar way.

Fig. 9. Ball computer system, containing a number of ball computers, display devices, mass storage and input output, all interconnected by wireless communication.

COMPUTING DEVICES

This invention relates to computing devices.

Although the technology of computing devices has advanced considerably in recent years, there are still many aspects to be improved.

For example, assembly of a computing device will still typically require considerable time, effort and expense. The construction of large and powerful computing devices can still be extremely expensive. Attempts to build computing devices in three dimensions have not met with great success.

The present invention provides an entirely new approach to the construction of computing devices. Preferred embodiments of the present invention may readily provide computing devices of small computing power, as well as computing devices of immense computing power, with a relatively cheap and simple method of construction. Moreover, computing devices having three-dimensional properties may readily be provided.

According to one aspect of the present invention, there is provided a computing device comprising a cluster of computing elements, wherein:
- a. each of the computing elements comprises a respective housing and a data processing element contained within the housing,
- b. each of the computing elements is arranged to carry out wireless communication with one or more of the other computing elements; and
- c. each of the computing elements is powered by wireless transfer of power from outside the computing element Preferably, none of said housings is fixed to any others of said housings, either directly or indirectly. In such an arrangement, said computing elements can be added to and removed from the cluster at will.

Preferably, each said data processing element is encapsulated within its respective housing.

Preferably, each said housing is of substantially spherical shape.

Preferably, said cluster is three-dimensional.

Preferably, said computing elements are placed loosely in a container to form said cluster.

Said computing elements may be juxtaposed at random in said container.

Said computing elements may be stacked upon one another.

Said computing elements may be arranged in holders, each holder being arranged to receive a plurality of said computing elements in predetermined juxtaposition.

A computing device as above may further comprise a light guide or waveguide extending through said cluster, to facilitate communication between said computing elements.

A computing device as above may further comprise cooling means for cooling said duster of computing elements.

Said computing elements may be provided with electrodes and immersed in an electrolyte with which said electrodes make contact to power said computing elements.

According to another aspect of the present invention, there is provided a method of constructing a computing device, comprising the steps of assembling together a plurality of computing elements, wherein:
- a. each of the computing elements comprises a respective housing and a data processing element contained within the housing;
- b. each of the computing elements is arranged to carry out wireless communication with one or more of the other computing elements; and
- c. each of the computing elements is powered by wireless transfer of power from outside the computing element.

Preferably, the computing device is in accordance with any of the preceding aspects of the invention.

According to another aspect of the present invention, there is provided a computing device comprising a plurality of computing elements arranged in a holder, wherein:
- a. each of the computing elements comprises a respective housing and a data processing element contained within the housing;
- b. the computing elements are arranged to communicate with one another; and
- c. the holder has a plurality of fasteners, each of which engages with the housing of a respective one of the computing elements to hold that computing element in place.

Said holder may be provided with a pair of power conductors and said computing elements arranged to make electrical contact with said power conductors.

Preferably, said computing elements are arranged to carry out wireless communication with one another.

Preferably, said holder is provided with a communication bus and said computing elements are arranged to intercommunicate via said communication bus.

A computing device as above may further comprise a light guide or waveguide extending through said holder, to facilitate communication between said computing elements.

Preferably, each said fastener comprises a recess to receive at least part of a respective said housing.

A computing device as above may further comprise cooling means for cooling said computing elements.

Said holder and said housings may be arranged to interengage by resilient deformation of at least part of said holder and/or said housings, such that said computing elements may be pushed into and pulled out of engagement with said holder by hand.

Said holder may comprise a plurality of trays, each having a plurality of said fasteners, and adapted to stack upon one another.

Preferably, all of said housings are of the same shape.

Preferably, all of said housings are of the same size.

Preferably, at least some of said data processing elements are arranged to perform different functions.

According to another aspect of the present invention, there is provided a method of constructing a computing device, comprising the steps of assembling together a plurality of computing elements, wherein:
- a. each of the computing elements comprises a respective housing and a data processing element contained within the housing;
- b. the computing elements are arranged to communicate with one another; and
- c. the holder has a plurality of fasteners, each of which engages with the housing of a respective one of the computing elements to hold that computing element in place.

Preferably, the computing device is in accordance with any of the preceding aspects of the invention.

For a better understanding of the invention, and to show how embodiments of the same may be carried into effect, reference will now be made, by way of example, to the accompanying diagrammatic drawings, in which.

In the figures, like reference numerals denote like or corresponding parts.

Figure 1:
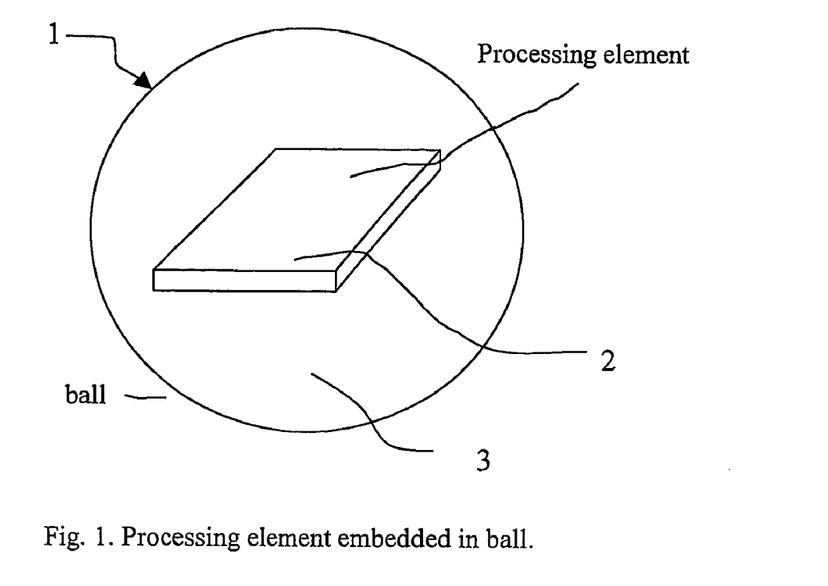
FIG. 1 illustrates a computing element comprising a data processing element embedded in a ball.

FIG. 1 illustrates a basic computing element 1 comprising a data processing element 2 embedded in a spherical housing 3, such that the computing element 1 takes the form of a ball. A computing device is built up by producing a number of such "computing balls" 1, and pouring the balls into a container, where they are provided with power and communicate with one another.

Power and communication facilities may be provided in a number of ways. Some examples are given below.

Figure 2:
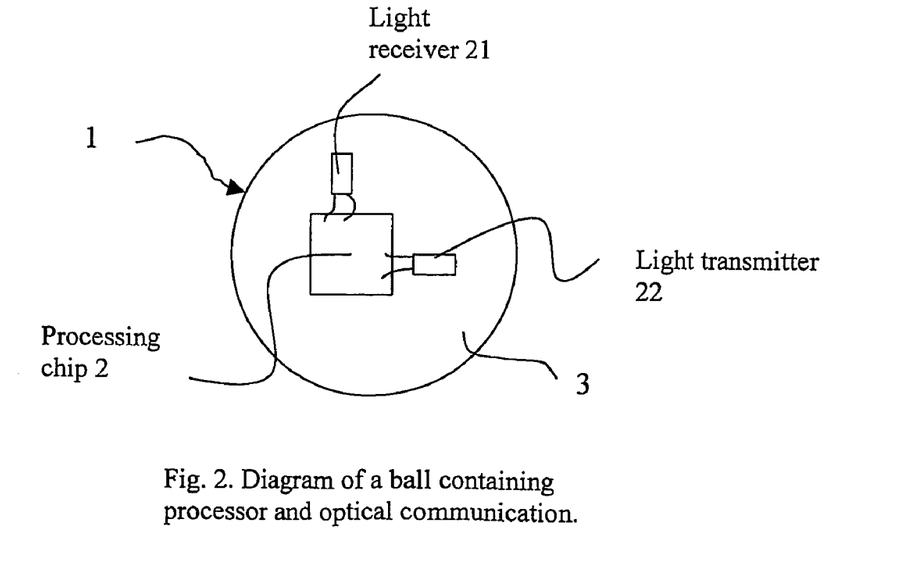
FIG. 2 is a diagram of a ball containing a data processor with optical communication.

FIG. 2 illustrates a computing ball 1 having a data processing element (typically a microchip) that is provided with a light-receiving element 21 and a light-transmitting element 22. A number of such computing balls 1 may communicate with one another using modulated light transmission, by way of the light receivers and transmitters 21, 22.

Figure 3:
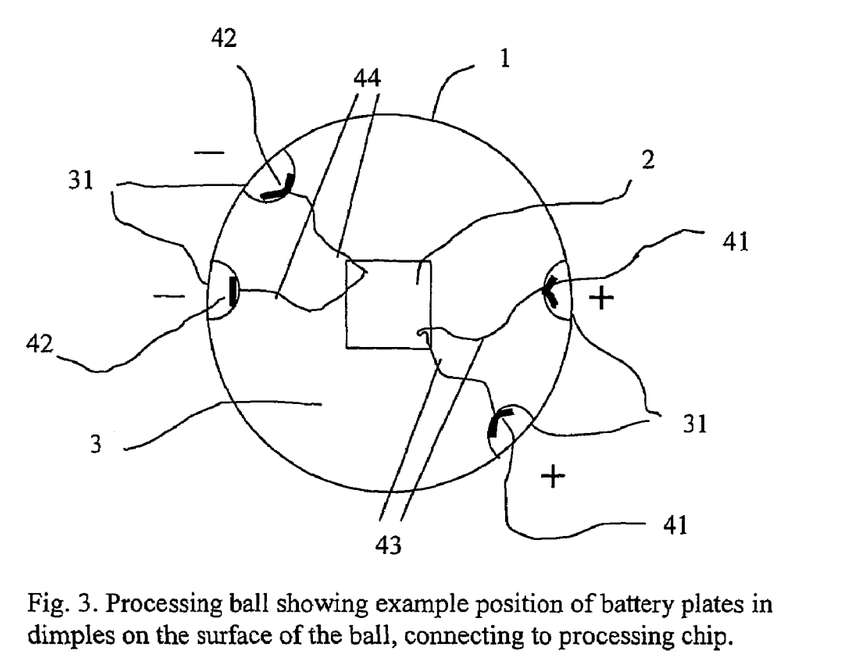
FIG. 3 illustrates a computing element with examples of battery plates in dimples on the surface of a ball, connecting to a data processing chip.

FIG. 3 shows a computing ball 1 having a processing chip 2 that receives its power from cathodes 41 and anodes 42 to which it is electrically connected by conductors 43 and 44. The cathodes and anodes 41, 42 are recessed within dimples 31 formed in the otherwise spherical surface of the housing 3. The computing ball 1, in use, is immersed in electrolyte, with which the cathodes and anodes 41, 42 react to generate an electric current to power the processing chip 2.

Figure 4:
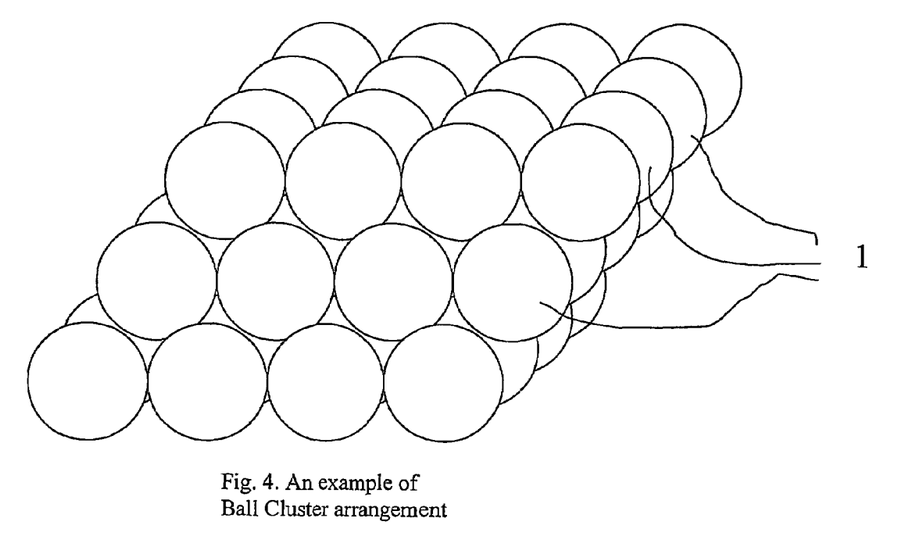
FIG. 4 illustrates an example of a duster of computing element balls.

FIG. 4 illustrates one example of a duster of computing balls 1, which are arranged in a suitable container (not shown) so as to minimise overall volume.

Figure 5:
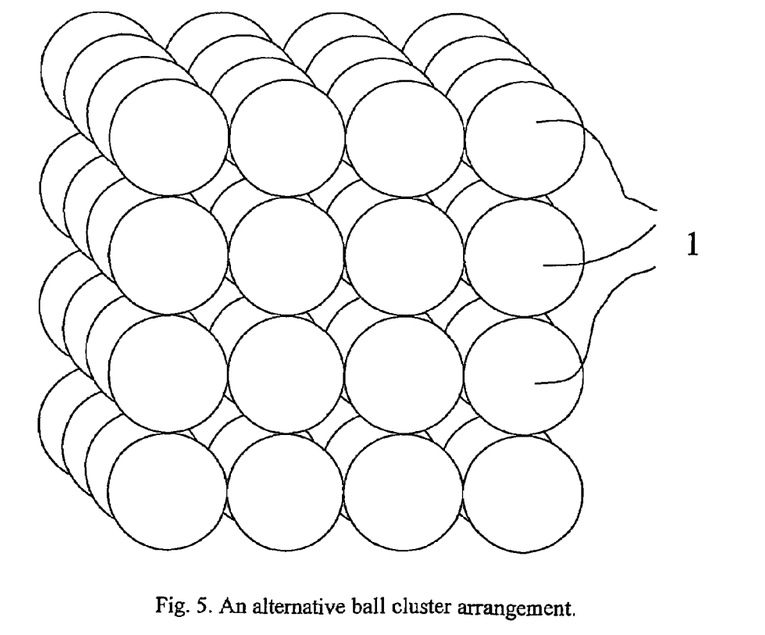
FIG. 5 illustrates an alternative ball duster arrangement.

FIG. 5 shows an alternative ball duster arrangement, in which the computing balls 1 are arranged in orthogonal rows and columns.

Figure 6:
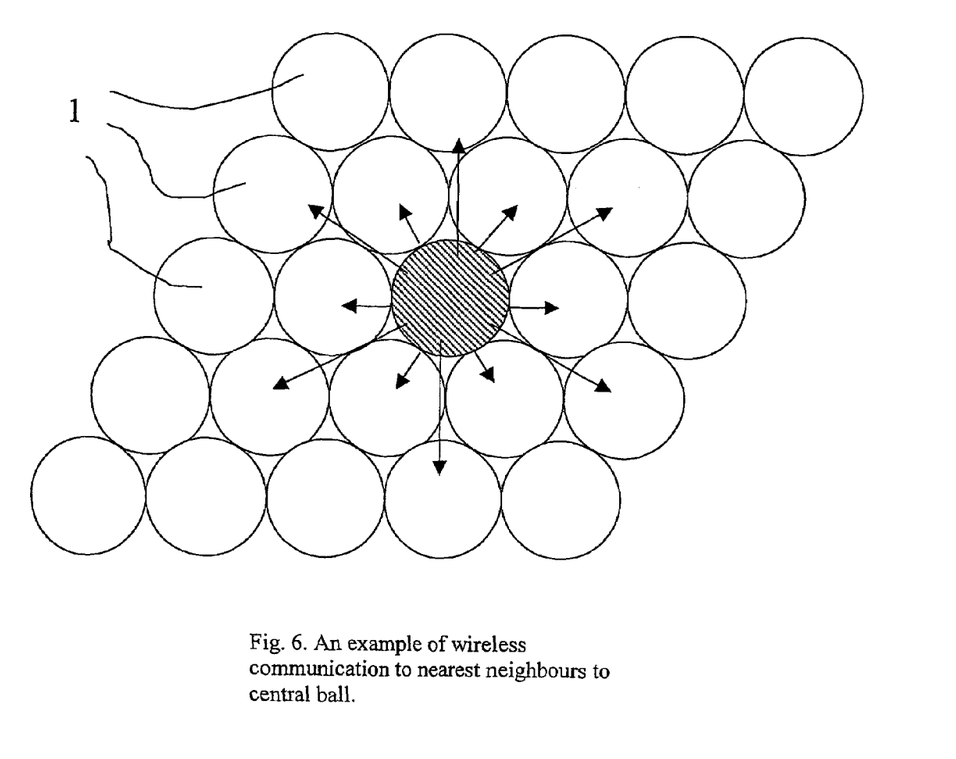
FIG. 6 illustrates an example of wireless communication in a ball cluster arrangement, to nearest neighbours of a central ball.

FIG. 6 illustrates how a central computing ball 1 of an array may carry out wireless communication with its nearest neighbours. As indicated above, the wireless communication may utilise light. Alternatively, it may use radio or any other suitable electromagnetic radiation technique. It will be appreciated that, since each computing ball 1 can communicate with at least some of its neighbours, or possibly all balls in a duster, depending upon the nature and strength of the radiation technique, all of the computing balls 1 may communicate with one another, either directly or indirectly, thus allowing organised processing to take place between the respective balls, some examples of which will be given below.

Figure 7:
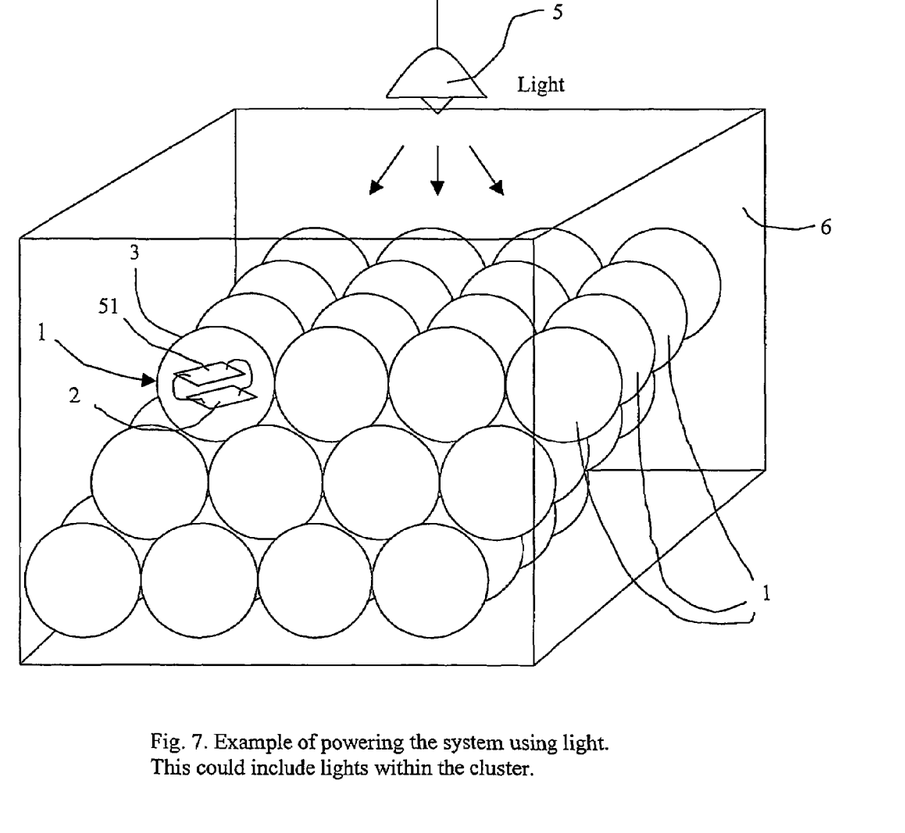
FIG. 7 illustrates an example of powering data processing elements in a ball cluster arrangement, using light.

FIG. 7 illustrates a cluster of computing balls 1 that are powered from a light source 5. In this case, each computing ball 1 contains within its housing 3 a photosensitive device 51 for receiving light from the light source 5 and converting it into energy to power the processing chip 2. In addition to the overhead light source 5 that is shown in FIG. 7, one or more further light source may be provided within the cluster of balls 1, that are shown in FIG. 7 as constrained within a container 6.

FIG. 8 again shows a duster of computing balls 1 in a container 6. In this example, the computing balls 1 are cooled by forcing chilled water from a cooling system 7 through the duster of balls. A supply flow 71 of chilled water is provided at the bottom of the container 6, and a return flow 72 is taken from the top of container 6 and returned to the cooling system 7.

Figure 8:
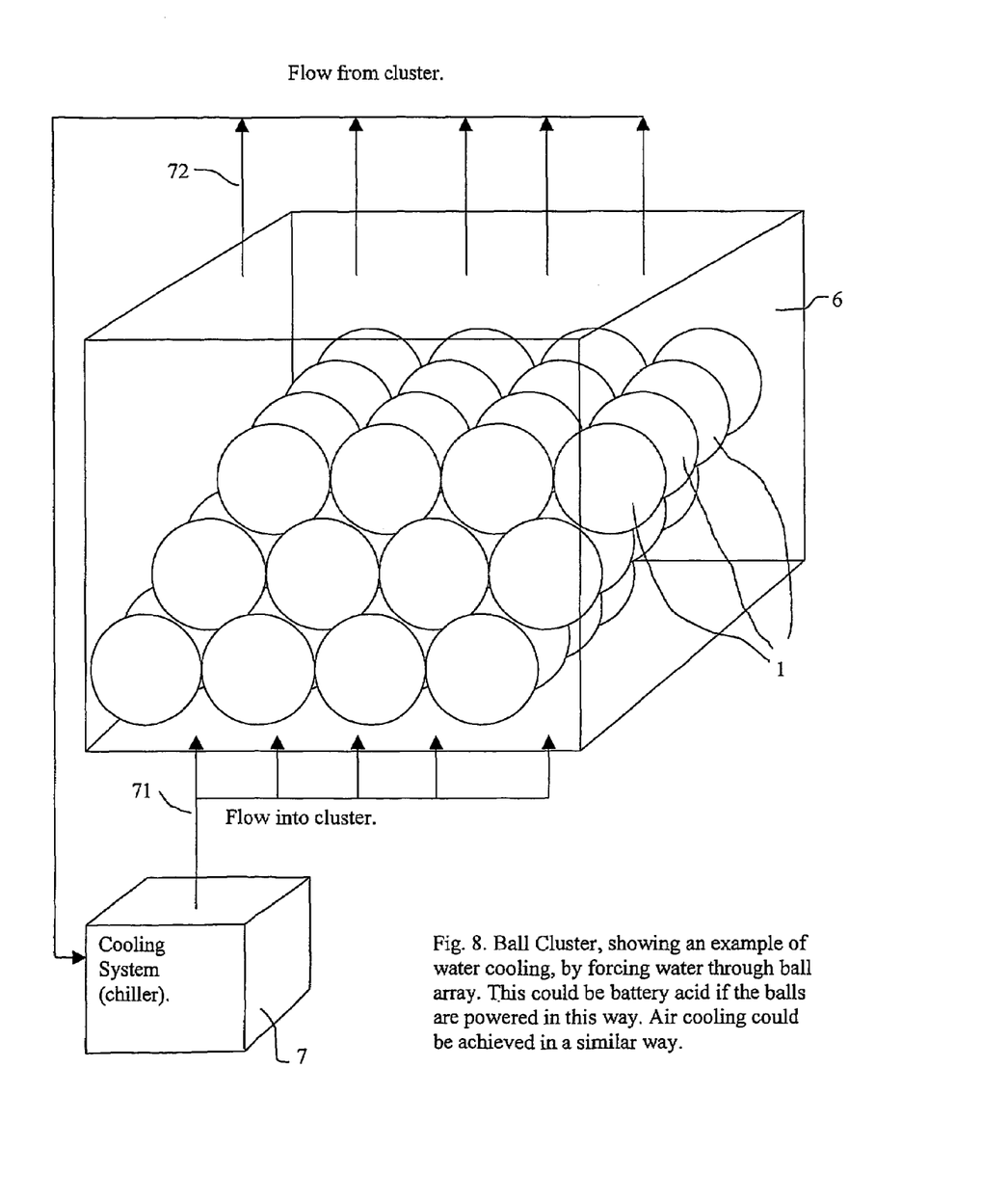
FIG. 8 illustrates forced water-cooling of a ball duster arrangement.

Any suitable fluid may used as an alternative to water, as the coolant medium. Where the power for the computing balls 1 is provided by electrochemical action—as, for example, in the embodiment shown in FIG. 3—the coolant fluid could also serve as an electrolyte. Air or other gas may be used as an alternative to liquid.

Figure 9:
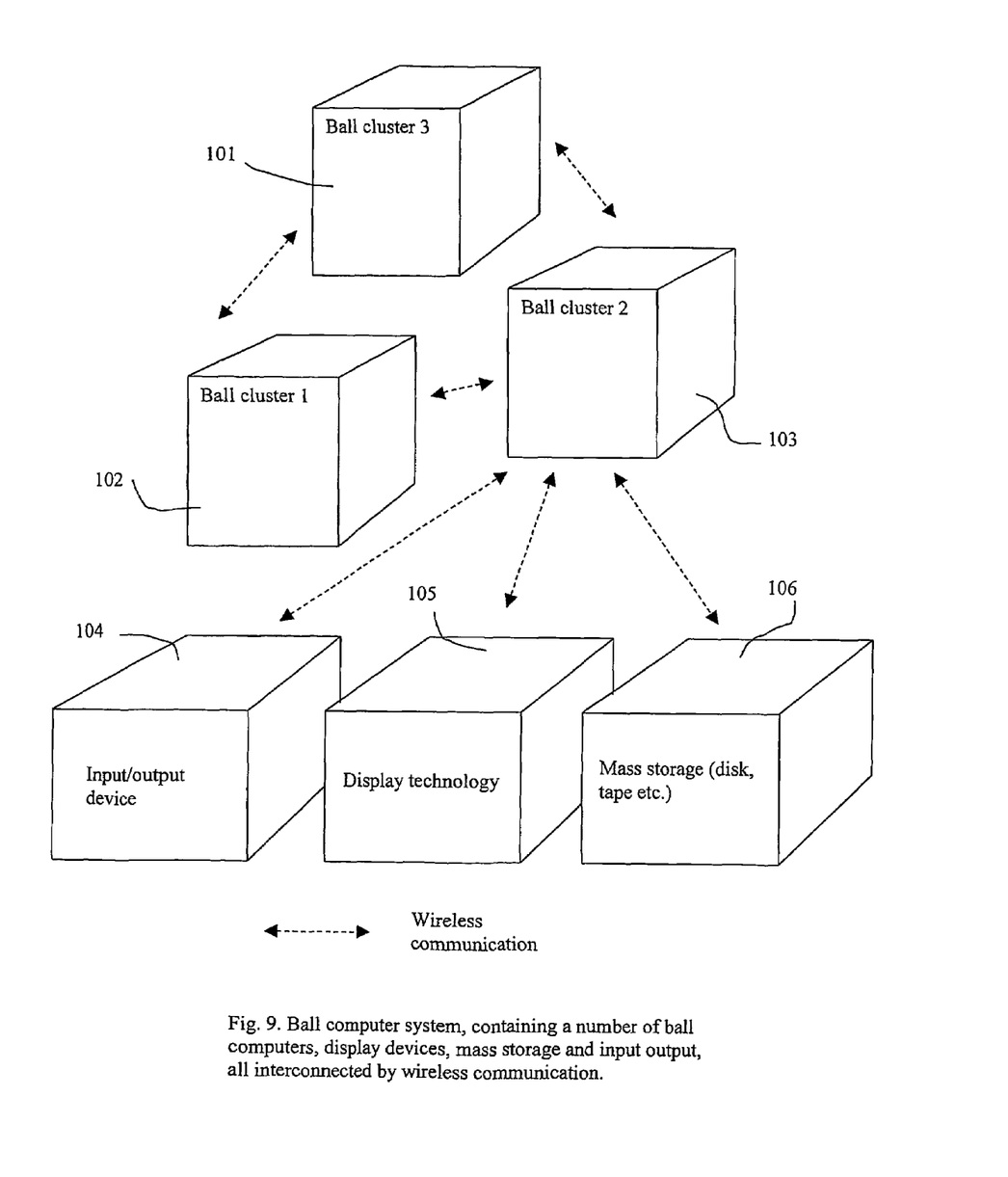
FIG. 9 illustrates a ball computer system, containing a number of ball computers, and display, mass storage and input-output devices, all with wireless intercommunication.

FIG. 9 illustrates a ball computer system, comprising three computing devices 101, 102 and 103, each made up of a cluster of computing balls 1. The ball computing devices 101, 102 and 103 communicate with one another by a wireless communication link and likewise communicate with an input-output device 104, a display device 105 and a mass storage device (disk, tape, etc) 106.

It will be appreciated from the above that computing devices of almost any desired computing power can be made cheaply and economically, in both two-dimensional and three-dimensional form.

Although the data processing elements 2 may be sophisticated and complicated if desired, or for a special application, it is preferred that, in general, the data processing elements 2 are very simple and cheap devices—for example, manufactured in large numbers as simple semiconductor chips that may be embedded directly within the spherical housings 3. Thus, the computing balls 1 may readily be produced very cheaply in large quantities, and the power of the overall computing device comes from the interaction of a large number of the computing balls 1.

Different computing balls 1 could have data processing elements 2 that perform different functions. For example, the data processing elements 2 may be selected from devices including microprocessors, memories, input-output devices, reconfigurable computing elements, or general electronic components. A data processing element 2 may comprise of only a part of, say, a microprocessor or a memory device, the overall processor or memory device being constituted by a plurality of computing balls 1. Reconfigurable logic could be used to make a plurality of balls into one processor.

The housing 3 may preferably be of a plastics material and, particularly if intercommunication by light medium is employed, the material of the housing 3 may be at least translucent and preferably transparent Although it is preferred that the housings 3 are of spherical shape, they could alternatively be of any other desired shape—for example cuboids, in which case they may stack together. Thus, it will be appreciated that, where the present description refers to "balls", other shapes may be substituted where practicable.

It is important to note that, in a preferred arrangement, there is no necessity for the computing elements 1 to interlock with one another. Although they could be juxtaposed in predetermined orientations and positions (especially if flat-sided), a preferred method of assembly is to pour computing balls 1 loosely into a container in a more or less random manner, and let the balls communicate with one another in a self-organising manner. The balls are poured loosely into the container in the sense that they are not held or constrained in any way, other than by the internal walls of the container and by each other—that is, they are "loose-filled" within the container.

Although preferred embodiments of the invention comprise computing balls 1 in a 3-D array or cluster, they may be arranged in any other desired disposition. Thus, for example, they may be organised singly, in a one-dimensional array (a line), a two-dimensional array, a three-dimensional array or any mixture of these arrangements.

The above-described computing elements are arranged to carry out wireless communication. That is, in general terms, they inter-communicate through a vacuum or fluid (liquid or gas) medium, without the use of external mechanical conductors in mechanical contact with the computing elements.

The above-described computing elements are arranged for the wireless transfer of power. That is, in general terms, power is transferred to the computing elements through a vacuum or fluid liquid or gas) medium, without the use of external mechanical conductors in mechanical contact with the computing element These features enable the computing elements to be arranged in any mutual juxtaposition. Thus, for example, as mentioned above, the computing elements can be poured or otherwise placed into a container, where they can adopt any random orientation—that is, a container can be loose-filled with the computing elements in random juxtapositions.

The computing elements 1 may be placed in holders if desired. For example, they may be placed in suitable receptacles—for example, having the form of an egg tray or egg box, from which they may be readily removed and replaced, either with or without any positive retaining feature (such as, for example, resilient engagement of a computing ball 1 in a flexible holder).

In an example, computing balls 1 engage resilient sockets in two-dimensional trays, such that the resilience of the sockets retains the computing balls positively in place, whilst allowing the computing balls to be readily withdrawn from the sockets, by sufficient pulling force, and replaced by other computing balls. Such trays can be stacked above one another. In this way, predetermined juxtapositions of computing balls may be achieved, and the computing balls may, if desired, be in predetermined orientations.

Each two-dimensional tray may be provided with two power conductors extending through the tray, and optionally arranged to make electrical contact with similar power conductors in an adjacent tray. The computing balls 1 then have external (possibly recessed) contacts to make electrical connections with the power conductors, in order to receive their power. The power conductors can also be used as a communication bus between the computing balls. Alternatively, there may be provided one, two, three, four or more common communication buses, to which all computing balls 1 are connected by electrical connections. For communication between the computing balls via a light medium, light guides (e.g. of plastics) may extend through the trays. For communication between the computing balls via a radio medium, waveguides may extend through the trays.

Computing elements such as the computing balls 1 could be embedded in a solid medium, which may be either flexible or rigid. For example, a translucent rubber-like medium for flexibility, or a transparent, solid plastics material for rigidity.

As indicated above, the computing balls 1 may communicate with one another using wireless communication—and examples of this have been given as modulation of light, radio waves, etc. As an alternative, the balls could be provided with small electrical contacts that connect with similar contacts on adjacent computing balls 1. An important feature is that the computing balls 1 are not hard-wired together, using either a printed circuit board or other interconnect wiring.

Where light transmission is used, the light transmission characteristics of the material of the housing 3 may be adjusted, in order to limit the distance of communication. For example, the housing 3 may be semi-opaque.

Typically, each ball may radiate for communication purposes in every direction, thus being able potentially to communicate with every other ball around it.

Some data processing elements may act as communication centres (switches), routing data between other computing balls 1. To assist this, light guides or other radiation guides could be threaded through the ball cluster.

Figure 10:
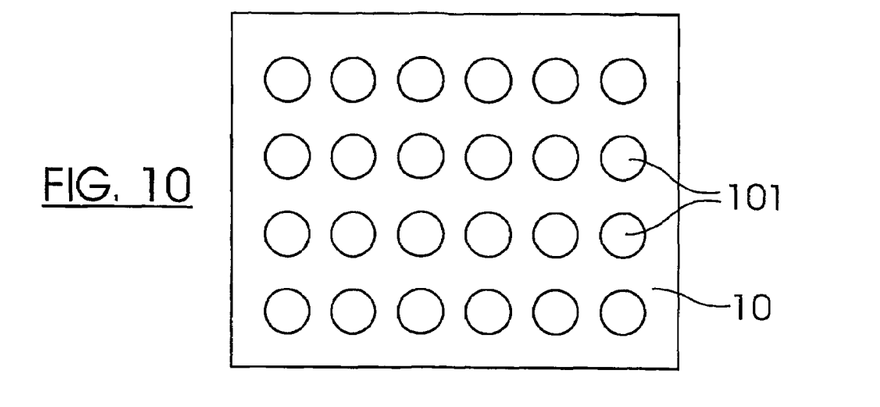
FIG. 10 shows a rack for holding computing balls.

FIG. 10 shows a holder for a plurality of computing balls 1, in the form of a rack 10 formed with a predetermined array of part-spherical recesses or sockets 101 that, in this example, are disposed in an orthogonal two-dimensional array. Other arrangements of the recesses 101 are possible.

Figure 11:
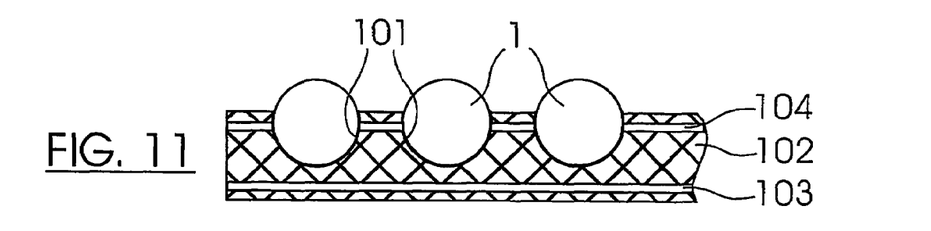
FIG. 11 is a cross-sectional view of part of the rack of FIG. 10, with computing balls, in one configuration.

As shown in the cross-sectional view of FIG. 11, the housings of the computing balls 1 are mechanically engaged within the recesses 101, to retain the computing balls 1 in place in the rack 10. To this end, the rack 10 has a body 102 which is formed of a material having a degree of resilience, such that the walls of the recesses 101 may be resiliently deformed to allow the computing balls 1 to be pushed into and pulled out of the recesses 101 by hand. The recesses 101 are somewhat larger than hemispherical, subtending an angle of greater than 180°, in order to retain the computing balls 1.

In FIG. 11, an optional light guide 103 is shown extending through the body 102, to facilitate communication between the balls 1 via a light medium. Another optional light guide 104 is shown opening into the recesses 101, to provide more direct optical communication with the computing balls 1. Light guides such as 103 and 104 may be arranged in an x-y array, extending in mutually orthogonal directions, to pass through or adjacent all of the recesses 101.

As has been indicated above, waveguides may be used to facilitate radio communication between the computing balls 1, as a variation of the light guides 103, 104.

Figure 12:
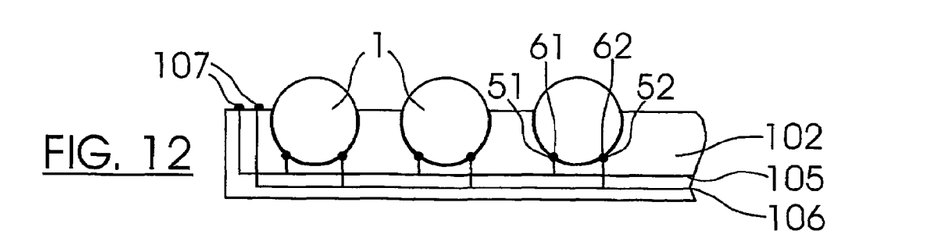
FIG. 12 is a cross-sectional view of part of the rack of FIG. 10, with computing balls, in another configuration.

FIG. 12 shows how simple power contacts may be provided to the computing balls 1. A pair of power conductors 105, 106 extend through the body 102 of the rack 10, terminating in external contacts 107 and internal contacts 51, 52 which establish electrical contact with corresponding contacts 61, 62 on the computing balls 1.

The contacts 51 and 52 may be annular contacts at different depths in the body 102, such that the contacts 61, 62 on the balls 1 may make electrical contact irrespective of the angular orientation of the ball 1.

Figure 13:
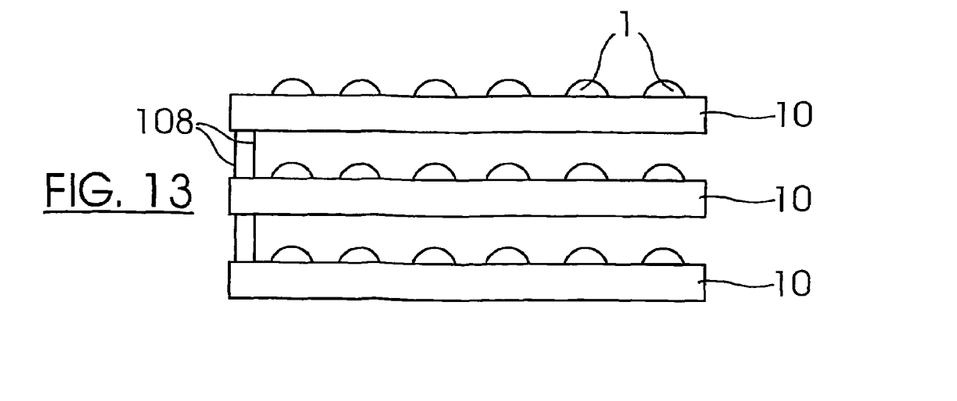
FIG. 13 shows a stack of racks as shown in FIG. 10, with computing balls in position.

FIG. 13 illustrates a plurality of racks 10 arranged one above the other, with electrical conductors providing power connections between the contacts 107 that are shown in FIG. 12. The arrangement is preferably such that individual racks 10 may be pulled out of the stack or otherwise accessed, in order to provide ready access to the computing balls 1 for insertion or removal.

Power connections need not be provided directly to the computing balls 1. The racks 10 may simple serve to hold the computing balls 1 in predetermined juxtapositions. It may be preferred to make the computing "balls" 1 of a different, non-symmetrical shape, or provide other keying means, with correspondingly shaped recesses 101, in order to provide a unique mutual orientation of each computing "ball" 1 and recess 101, when interengaged.

Alternative plug-and-socket or other physical connections may be provided between the rack 10 and the balls 1. For example, the balls 1 may be formed with sockets to receive plugs or spigots provided on the rack 10—for example, in a readily releasable push-fit or snap-fit manner.

As indicated above, the computing balls 1 could self-organise into an array, or a required processing function. Functional computing balls 1 could identify any failed computing balls 1, and map them out of a working array or processing function. The data processing elements 2 could be configured manually or by automated software. In this respect, software programs for automatically organising processing components into a desired structure or function will be well known to the reader skilled in the art The use of reconfigurable logic would be of assistance, but not essential.

Computing balls 1 in a system could be of any size and varying in size. It is difficult to give precise guides as to size, since technology continues to drive down physical size for a given performance. However, at the present time, it is envisaged that computing balls 1 may have a diameter from 5 millimetres upwards, and typically a diameter in the range 10 to 50 millimetres, and perhaps up to 100 millimetres, although there is no upper limit.

One to any number of balls could be used in a system. It is envisaged that, for many computing devices, 10 or more computing balls 1 will be required. For a relatively high-powered computing device, a container of cube shape with 1-metre sides (that is, one cubic metre of volume) may contain $10^2$ computing balls 1 of 10 millimetres diameter along each axis, giving a total of $10^6$ computing balls if in an orthogonal array, or more if nested to occupy minimum volume. Thus, computing devices of differing powers may contain computing balls 1 in numbers of the order $10^2$, $10^3$, $10^4$, $10^5$, $10^6$, $10^7$ and higher.

The computing balls 1 may use asynchronous or self-timed circuits to reduce power use, so that the overall computing device could be light-powered, and generate little heat As an alternative to using light to power the computing balls 1, other electromagnetic radiation could be used—for example, radio waves—together with suitable receivers in the computing balls 1 that absorb the electromagnetic radiation and convert it to power for the data processing elements 2.

Computing devices as described above may allow universal computation that involves both serial and parallel problems to be solved. They may be utilised in any field of computing.

For example, in specific applications for a massively parallel machine:

Chemical simulation—for example, computing how molecules and proteins fold up.

CFD—for example, computing the structural stress in materials.

Heart simulation—for example, modelling the beating heart.

Brain simulation—for example, modelling the operation of neurons and groups of neurons.

Weather forecasting—for example, modelling weather patterns, each ball representing a region of the atmosphere.

Computer simulation—for example, building models of large communication networks.

Physics—for example, computation of nuclear explosions.

In a specific application where the balls work together to make a single processor:

Military systems, which need to be very resilient If the whole system is encapsulated, then it can be very robust The use of multiple, reconfigurable, elements allows redundancy to be built in.

In applications as a reconfigurable parallel machine:

A processor that can alter its function depending on the operation required, for example a system configures to be machine-specific to compilation of programmes, then configures to run the program most optimally. This is a typical existing application of reconfigurable technology.

As a toy for children to play with: Light output (and sound) may be provided to make the balls interesting. They might act as individual processing units or as a group and be sensitive to the their neighbours as the balls are moved around.

2D/3D display technology: If electrolytic and/or cooling fluid were provided with the same refractive index as see-through plastic housings 3, a box of such computing balls in the fluid would only show the processing elements. These elements could then be used to build a 2-D or a 3-D display, if each component had a light output capability and was sufficiently small Key features of preferred embodiments of the invention include:

Mass-production capability, due to simplicity of the data processing elements 2 and simplicity of the housings 3.

Simple, massive inter-processor communication between the balls with no wires.

Simple construction of parallel machines or single processor machines. Just pour them into a box.

Simple construction of a 3D processor. The approach makes simple the construction of large arrays or large single computers, breaking away from the inherent 2-D design of all current computers.

Low cost. The mass production of the balls and the simple way to interconnect the balls (via wireless) allows low-cost production.

In this specification, the verb "comprise" has its normal dictionary meaning, to denote non-exclusive inclusion. That is, use of the word "comprise" (or any of its derivatives) to include one feature or more, does not exclude the possibility of also including further features.

The reader's attention is directed to all and any priority documents identified in connection with this application and to all and any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computing device comprising a cluster of computing elements, wherein:
   a. each of the computing elements comprises a respective housing and a data processing element contained within the housing;
   b. each of the computing elements is arranged to carry out wireless communication with one or more of the other computing elements; and
   c. each of the computing elements is powered by wireless transfer of power from outside the computing element.

2. A computing device according to claim 1, wherein none of said housings is fixed to any others of said housings, either directly or indirectly.

3. A computing device according to claim 1, wherein each said data processing element is encapsulated within its respective housing.

4. A computing device according to claim 1, wherein each said housing is of substantially spherical shape.

5. A computing device according to claim 1, wherein said cluster is three-dimensional.

6. A computing device according to claim 1, wherein said computing elements are placed loosely in a container to form said cluster.

7. A computing device according to claim 6, wherein said computing elements are juxtaposed at random in said container.

8. A computing device according to claim 6, wherein said computing elements are stacked upon one another.

9. A computing device according to claim 1, wherein said computing elements are arranged in at least one holder arranged to receive a plurality of said computing elements in predetermined juxtaposition.

10. A computing device according to claim 9, wherein said holder has a plurality of fasteners, each of which engages with the housing of a respective one of the computing elements to hold that computing element in place.

11. A computing device according to claim 10, wherein each said fastener comprises a recess to receive at least part of a respective said housing.

12. A computing device according to claim 10, wherein said holder and said housings are arranged to interengage by resilient deformation of at least part of said holder and/or said housings, such that said computing elements may be pushed into and pulled out of engagement with said holder by hand.

13. A computing device according to claim 10, wherein said holder comprises a plurality of trays, each having a plurality of said fasteners, and adapted to stack upon one another.

14. A computing device according to claim 1, further comprising a light guide or waveguide extending through said cluster, to facilitate communication between said computing elements.

15. A computing device according to claim 1, further comprising cooling means for cooling said cluster of computing elements.

16. A computing device according to claim 1, wherein said computing elements are provided with electrodes aid are immersed in an electrolyte with which said electrodes make contact to power said computing elements.

17. A computing device according to claim 1, wherein all of said housings are of the same shape.

18. A computing device according to claim 1, wherein all of said housings are of the same size.

19. A computing device according to claim 1, wherein at least some of said data processing elements are arranged to perform different functions.

20. A method of constructing a computing device, comprising the steps of assembling together a plurality of computing elements, wherein:
   a. each of the computing elements comprises a respective housing and a data processing element contained within the housing;
   b. each of the computing elements is arranged to carry out wireless communication with one or more of the other computing elements; and
   c. each of the computing elements is powered by wireless transfer of power from outside the computing element.

* * * * *